(12) United States Patent
Zhang et al.

(10) Patent No.: US 12,423,297 B2
(45) Date of Patent: Sep. 23, 2025

(54) MONITORING METADATA SYNCHRONIZATION AND AGGREGATION

(71) Applicant: INTERNATIONAL BUSINESS MACHINES CORPORATION, Armonk, NY (US)

(72) Inventors: Bao Zhang, Beijing (CN); Xi Qing Zhang, Beijing (CN); Jin Hong Fu, Beijing (CN); He Huang, Beijing (CN); Shi Chong Ma, Beijing (CN); Jia Yu, Beijing (CN); Mu Chen, Beijing (CN); Hui Zhang, Shanghai (CN); Ran Ren, Shanghai (CN); Xing Xing Shen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 17/807,264

(22) Filed: Jun. 16, 2022

(65) Prior Publication Data
US 2023/0409568 A1 Dec. 21, 2023

(51) Int. Cl.
*G06F 16/242* (2019.01)
*G06F 16/23* (2019.01)
*G06F 16/2457* (2019.01)
*G06F 16/25* (2019.01)

(52) U.S. Cl.
CPC ........ *G06F 16/244* (2019.01); *G06F 16/2358* (2019.01); *G06F 16/2457* (2019.01); *G06F 16/258* (2019.01)

(58) Field of Classification Search
CPC .............. G06F 16/244; G06F 16/2358; G06F 16/2457; G06F 16/258
See application file for complete search history.

(56) References Cited

U.S. PATENT DOCUMENTS

| | | | |
|---|---|---|---|
| 9,152,642 B2 | 10/2015 | Harrison | |
| 11,048,677 B1 | 6/2021 | Chandrashekar | |
| 2006/0095661 A1* | 5/2006 | Fleiner | G06F 11/2089 711/114 |
| 2010/0153566 A1 | 6/2010 | Sheleheda | |
| 2014/0289390 A1 | 9/2014 | Hughes | |
| 2015/0278024 A1 | 10/2015 | Barman | |
| 2015/0312331 A1* | 10/2015 | Crocker | G06F 15/167 709/205 |

(Continued)

OTHER PUBLICATIONS

Mell et al., "The NIST Definition of Cloud Computing", National Institute of Standards and Technology, Special Publication 800-145, Sep. 2011, pp. 1-7.

*Primary Examiner* — Jorge A Casanova
*Assistant Examiner* — Aryan D Toughiry
(74) *Attorney, Agent, or Firm* — Andre L. Adkins

(57) ABSTRACT

A method, computer system, and a computer program for monitoring synchronization and aggregation are provided. The method may include receiving a plurality of metrics and identifying a plurality of metadata associated with the plurality of metrics. The method may further include calculating a hash value of the plurality of metadata based on the plurality of metrics. The method may further include detecting at least one modification to the plurality of metadata based on the hash value and updating the plurality of metrics based on the at least one modification in which the plurality of metrics are displayed in a self-adapting metric diagram.

20 Claims, 10 Drawing Sheets

(56) References Cited

U.S. PATENT DOCUMENTS

| | | | |
|---|---|---|---|
| 2016/0072800 A1* | 3/2016 | Soon-Shiong | G16B 50/00 |
| | | | 726/7 |
| 2018/0189369 A1* | 7/2018 | Baek | G06F 40/197 |
| 2021/0058320 A1* | 2/2021 | Vutharkar | G06F 7/14 |
| 2021/0342337 A1 | 11/2021 | Lu | |
| 2021/0374610 A1* | 12/2021 | Dirac | G06N 20/00 |
| 2022/0197670 A1* | 6/2022 | Lindholm | G06F 16/2255 |
| 2022/0291852 A1* | 9/2022 | Mor | G06F 3/0641 |
| 2023/0144349 A1* | 5/2023 | Kodavati | G06F 16/214 |
| | | | 707/602 |

* cited by examiner

MONITORING METADATA SYNCHRONIZATION AND AGGREGATION

BACKGROUND

The present invention relates generally to the field of data management, and more particularly to synchronization and aggregation of metadata.

Information technology analytics within multi-layered systems and technology platforms, such as Artificial Intelligence for IT Operations ("AIOPS"), depend on metrics and logs to optimize automation, performance monitoring, event correlation, etc. However, if there are inaccuracies and inconsistencies with metrics and derivatives thereof, then the ability to diagnose and troubleshoot problems is directly impacted.

SUMMARY

Additional aspects and/or advantages will be set forth in part in the description which follows and, in part, will be apparent from the description, or may be learned by practice of the invention.

Embodiments of the present invention disclose a method, system, and computer program product for monitoring metadata synchronization and aggregation. A computer receives a plurality of metrics and identifies a plurality of metadata associated with the plurality of metrics. The computer may further calculate a hash value of the plurality of metadata based on the plurality of metrics. The computer may further detect at least one modification to the plurality of metadata based on the hash value and update the plurality of metrics based on the at least one modification in which the plurality of metrics are displayed in a self-adapting metric diagram.

In some embodiments, the computer is further configured to synchronize the metrics metadata in a distributed environment via synchronizing a plurality of servers and associated databases based upon the at least one modification.

In some embodiments, the computer program product is designed to support a plurality of agents running various software versions, which allows the modifications to the metric metadata to result in updated metrics free of inconsistencies derived from the various software versions.

In some embodiments, the computer is configured to utilize the plurality of metrics in order to generate a self-adapting metrics diagram, in which the self-adapting metrics diagram is designed to depict metrics free of inconsistencies derived from the agents and support user interactions in order to provide improvements to the computing system based upon the metrics.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
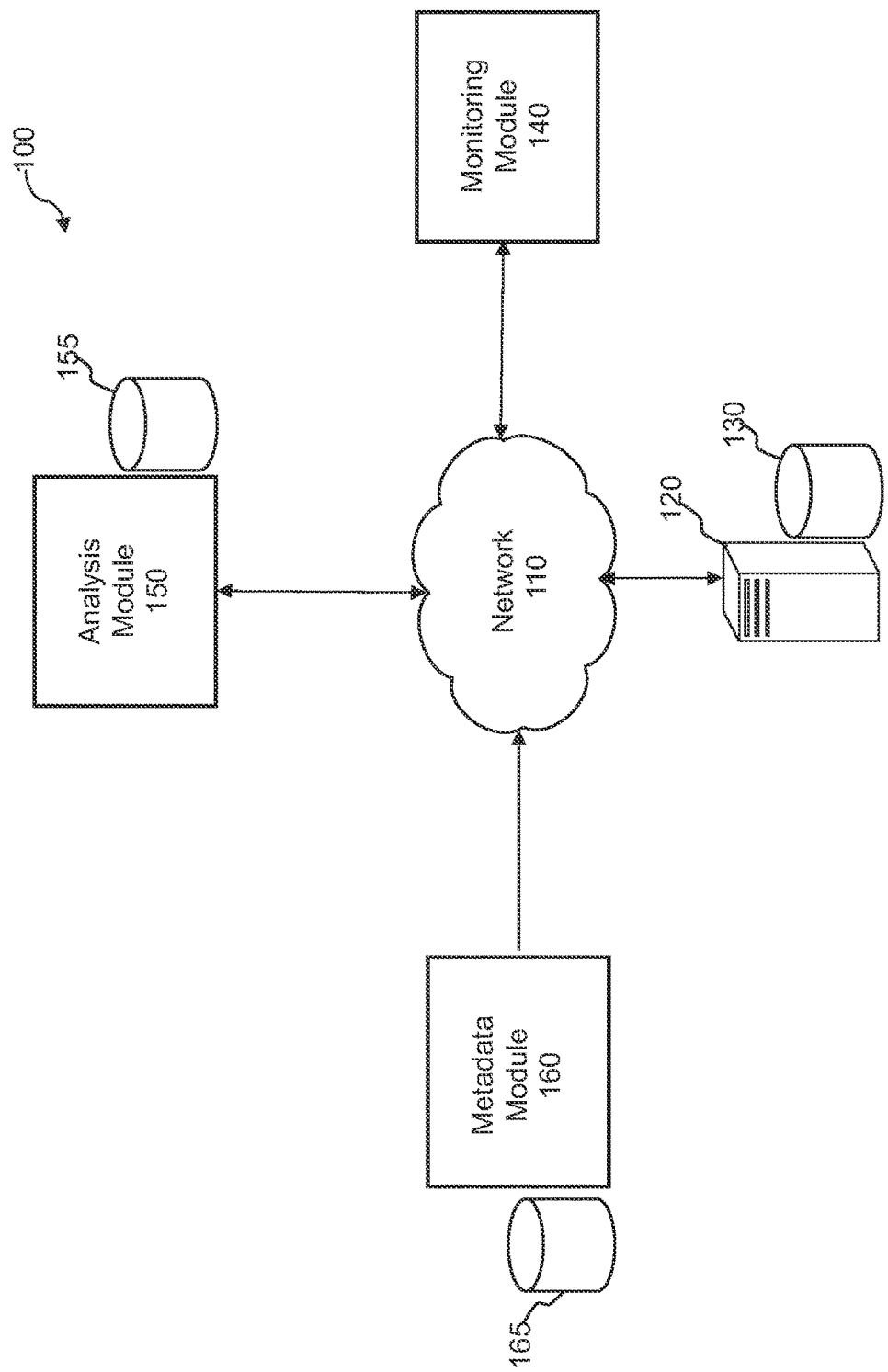
FIG. 1 illustrates a functional block diagram illustrating a computational environment for metadata synchronization and aggregation according to at least one embodiment.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for monitoring metadata synchronization and aggregation.

As described herein, metrics are a measure of hardware and/or software-related characteristics within a computing system which are countable/quantifiable and utilized for the purpose of planning, organization, control, and/or improvement.

As described herein, an agent is a computer component that functions as an proxy for a user or another program, working autonomously and continuously in a particular environment.

Metrics, which are essentially vital signs within multi-layered systems, tend to be inconsistent with the applicable metadata. One of the reasons for the inconsistencies is because metric metadata within some systems is provided as a comment at one layer (e.g., data tier) and ignored at another layer (e.g., application tier). These inconsistencies can result in reports and diagrams detailing system analytics that are not only inaccurate, but also fail to enable users to timely identify and troubleshoot issues within systems. In addition, retrieving metrics based on pulling requests requires pulling voluminous amounts of metadata which typically results in a waste of computer processing time, computer memory space, network bandwidth, and other computer resources every time there is a new request for metrics.

Metrics metadata is plagued with several issues due to factors such as incorrect standardization (e.g., mismatching default data type and unit), inconsistencies across agent versions, etc. For example, agents may proactively monitor, manage, and resolve performance issues across the entire IT landscape before they impact end-user productivity; however, some agents depending on the version may only support a particular function and/or programming language resulting in inconsistent metrics. These inconsistencies not only require user intervention in order to rectify resulting metadata-related outputs (e.g., metrics diagrams), but also they make the performance optimization process more difficult by providing incorrect metric diagrams that complicate troubleshooting. In addition, the process of collecting metrics metadata in systems such as multi-layered computer architectures inefficiently utilizes computing resources due to not only metadata redundancy among the layers, but also the extensive computing resources wasted (and other network resources) due to periodic pull requests for data and other network traffic. Furthermore, agents associated with the system may possess differing software versions that render inconsistencies regarding data type and data unit. Utilizing the current approach, the metrics associated with the most recent agent overwrites the metrics of the previous versions; however, this approach does not resolve the issues of data inconsistency nor does it increase the accuracy of the metrics overall. As such, the present embodiments, have the capacity to monitor metrics and synchronize supporting metadata in a manner that is configured to not only address the inconsistency of metrics caused by the aforementioned issues, but also to reduce waste of computing resources that is inherent to periodic metadata transferring. In particular, the present embodiments aggregate and synchronize metric metadata within a cloud environment which results in resource efficient metadata transferring, metrics consistency across multiple versions of agents, and self-adapting metrics diagrams that significantly optimize the troubleshooting process.

Referring now to FIG. 1, an environment for metadata synchronization and aggregation 100 is depicted according to an exemplary embodiment. FIG. 1 provides only an illustration of implementation and does not imply any limitations regarding the environments in which different embodiments may be implemented. Modifications to environment 100 may be made by those skilled in the art without departing from the scope of the invention as recited by the claims. In some embodiments, environment 100 includes a server 120 communicatively coupled to a database 130, a monitoring module 140, an analysis module 150, a metadata module 160, and a metadata database 165 communicatively coupled to metadata module 160, each of which are communicatively coupled over a network 110. Network 110 may include various types of communication networks, such as a wide area network (WAN), local area network (LAN), a telecommunication network, a wireless network, a public switched network and/or a satellite network, etc. In some embodiments, network 110 may be embodied as a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. It should be appreciated that FIG. 1 provides only an illustration of one implementation and does not imply any limitations with regard to the environments in which different embodiments may be implemented. Many modifications to the depicted environments may be made based on design and implementation requirements.

In a preferred embodiment, server 120, monitoring module 140, and/or analysis module 150 are communicatively coupled to metadata module 160 in order for metadata module 160 to provide metadata set aggregation functionality and metadata set synchronization functionality across the tiers of a multi-layered system for each respective module along with the one or more agents. The resulting metric metadata ascertained from the aforementioned modules is configured to be stored in metadata database 165 in which metadata database 165 may be accessed based on calculated hash values configured to link the metric data received from the applicable module to the respective metadata. However, in some embodiments, each respective module includes one or more servers (as reflected in FIG. 2) associated with one or more module databases in which metadata module 160 is configured to aggregate metadata sets into the one or more module databases. Metadata database 165 may be a repository designed for aggregations of metadata in which metadata database 165 may include a predefined format such as, <metadata hash value>:<type>: <help LN>. In some embodiments, analysis module 150 further includes a metrics database 155 configured to house metrics data based upon one or more determinations of server 120 and/or analysis module 150 based on the analysis of data received by analysis module 150 while it is continuously listening.

It should be noted that environment 100 may include a plurality of computing devices associated with and/or communicatively coupled to server 120, monitoring module 140, analysis module 150, and metadata module 160 in which database 130 may comprises any number and type of data sources that collect and store structured data pertaining the plurality of computing devices. In accordance with aspects of the invention, each computing device may respectively include, without limitation, smartphones, tablet computers, laptop computers, desktop computers, personal digital assistants, point-of-sale terminals, inventory scanners, sensors, IoT devices, and/or other applicable hardware/software. Each computing device may have components similar to those in server 120, and may have additional components not shown in FIG. 1. In some embodiments, each computing device may store and run one or more software agents that communicate, via the network 110, which are configured to be communicatively coupled to one or more of server 120, monitoring module 140, analysis module 150, and/or metadata module 160. In some embodiments, monitoring module 140 includes applicable monitoring software, that collects data related to application usage, application performance, application faults, application latency, resource utilization, hard drive usage percent, number of hard drive errors, average memory usage, average CPU usage, hours powered on, CPU utilization, memory utilization, network bandwidth consumed per application, errors logged in the operating system, power average, time since the specified system's installation, clock speed, memory type, OS install date, etc. In addition, monitoring module 140 is configured to collect monitoring data which may pertain to, but is not limited to: hard drive capacity, hard drive speed, days old, device ID, device name, device manufacturer, IMEI, device model number, device enrollment date/time, memory total, storage total, memory available, storage available, charge status, or any other applicable type of hardware/software related monitoring data known to those of ordinary skill in the art. Each component of environment 100 may provide data to metadata module 160 in which metadata module 160 generates sets of data that describes and gives information about other data referred to as "metadata". In some embodiments, server 120 is configured to generate a centralized platform designed to not only present one or more graphical representations of the collection and presentation of applicable data derived from the aforementioned modules, but also provide users with a mechanism to view/edit data, metadata, and analytics associated with environment 100. Analysis module 140 may include a data layer in which the data layer is configured to include at least one or more of: a device master module, a device metrics module, an aggregate metrics module, and a trend metrics module based on data derived from metadata module 160.

A drawback that the present invention seeks to overcome is that metrics metadata derived from data collected by one or more of the aforementioned modules such as data type, data unit (e.g., "KB", "MB", "GB", etc.), help, etc. are unaccounted for across the modules due to various reasons. For example, the one or more software agents may provide metrics metadata as a comment, which results in the metrics metadata being ignored by monitoring module 140 or any other applicable module. Traditionally, the metrics are correlated with defaulted data types and units which directly impacts the accuracy of the metrics. For example, the software agents may respectively run different versions of software and/or versions of metrics including different data types, units, help, etc., in which the data type and unit utilized by the most recent agent is deemed the default and overwrites previous versions, which not only directly impacts the correlation accuracy but also resulting diagrams of metrics in which the diagrams may be so inaccurate that they prevent proper and timely troubleshooting without significant user intervention. In addition, this approach may also result in data redundancy impacting the storage capacity associated with applicable systems.

Figure 2:
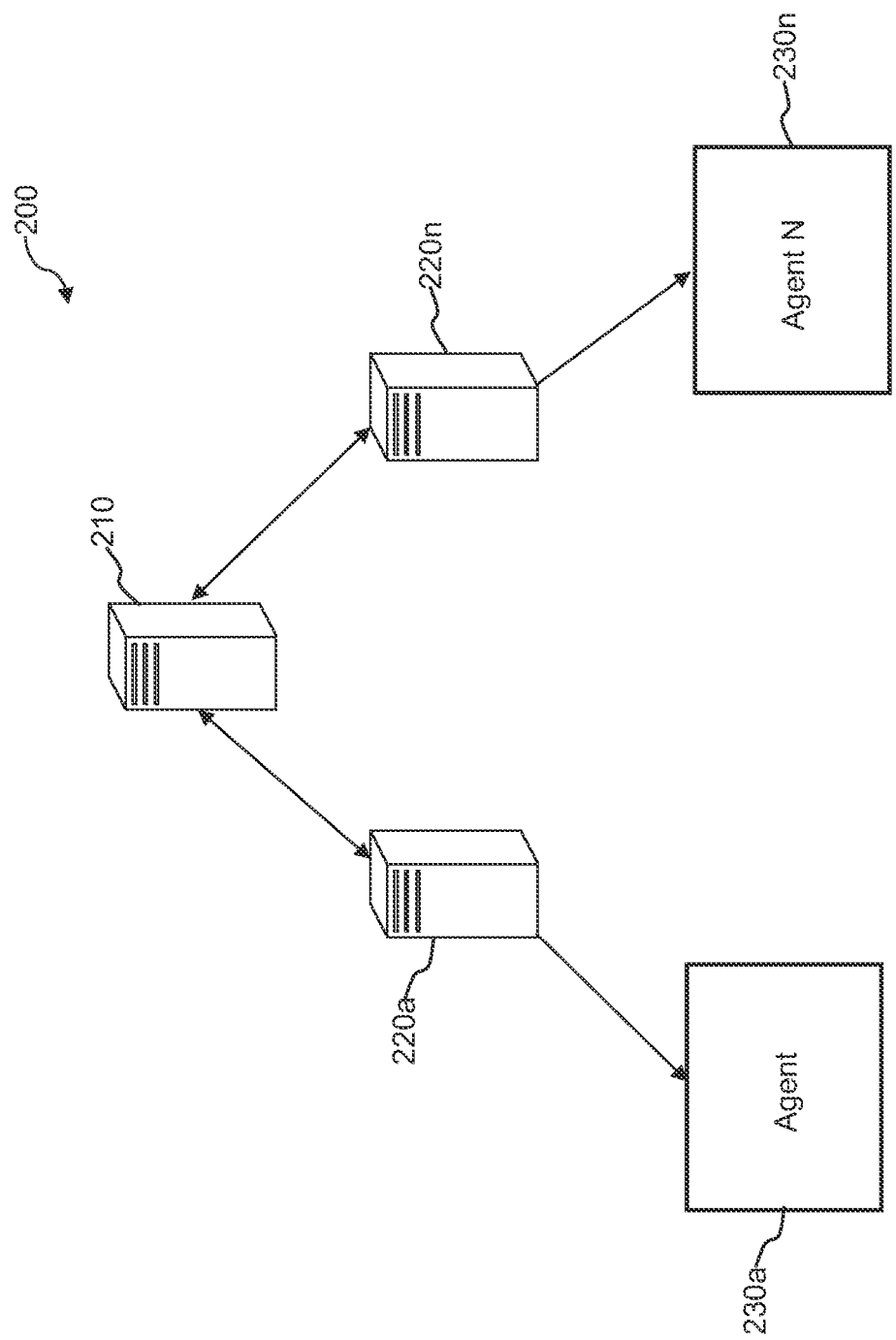
FIG. 2 illustrates a computer architecture associated with the computational environment of FIG. 1 according to at least one embodiment.

Referring now to FIG. 2, a multi-layered architecture 200 for environment 100 is depicted, according to an exemplary embodiment. In some embodiments, architecture 200 includes an analysis server 210 associated with analysis module 150, a plurality of monitoring servers 220a-n associated with monitoring module 140, and a plurality of agents 230a-n associated with the computing devices that server 120, monitoring module 140, and analysis module 150 are communicatively coupled to. In some embodiments, agents 230a-n are client programs deployed on outside systems in order to provide availability data to assist server 120 and/or monitoring module 140 in performing automatic monitoring and reporting. In some embodiments, monitoring servers 220a-n communicate with metadata module 160 in order for monitoring module 140 and agents 230a-n to properly synchronize the metrics metadata in a distributed environment, such as a cloud network. In some embodiments, agents 230a-n are configured to allow users to update metric metadata dynamically via one or more user interfaces provided on the centralized platform operating on an applicable computing device. It should be noted that the flow of data throughout architecture 200 is imperative to the optimization of pulling requests and utilization of computing resources. For example, metadata generated by metadata module 160 is received by analysis server 210 in which the metadata module 160 assists analysis server 210 by providing metadata set aggregation functionality and metadata set synchronization functionality prior to the metadata being transmitted to monitoring servers 220a-n. This configuration is useful for analysis server 210 to control the synchronization with monitoring servers 220a-n due to the fact that analysis server 210 is configured to initiate queries/pull requests that allow analysis server 210 to actively pull metadata from monitoring servers 220a-n.

In a preferred embodiment, analysis module 150 is continuously searching for and receiving data in order to ascertain metrics associated with the plurality of computing devices and/or components of environment 100, in which analysis server 210 is configured to determine whether the received data pertains to a metrics dataset or metadata set via analyses of respective components. Based upon this determination, analysis server 210 either stores the metadata into metadata database 165 or stores the metric data into metrics database 155. Metadata module 160 communicates with agents 230a-n allowing agents 230a-n to calculate a hash value for the respective metadata based on metrics definitions derived from one or more parameters extracted from within service specific configuration files, such as YAML, a human-readable data serialization language, JSON file, or any other applicable data file known to those of ordinary skill in the art. In some embodiments, the YAML files are configured to not only include metric definitions, but also facilitate communications with applicable nodes within architecture 200. It should be noted that the hash value is not only configured to function as a label for the metadata, but also it is used as a reference for detecting change to the metadata. In addition, the hash value is configured to enable support of multiple versions and variations of metadata within architecture 200. Agents 230a-n receive respective pull requests from monitoring servers 220a-n in which agents 230a-n analyze the respective pull requests in order to ascertain the one or more parameters of the metrics.

Figure 3:
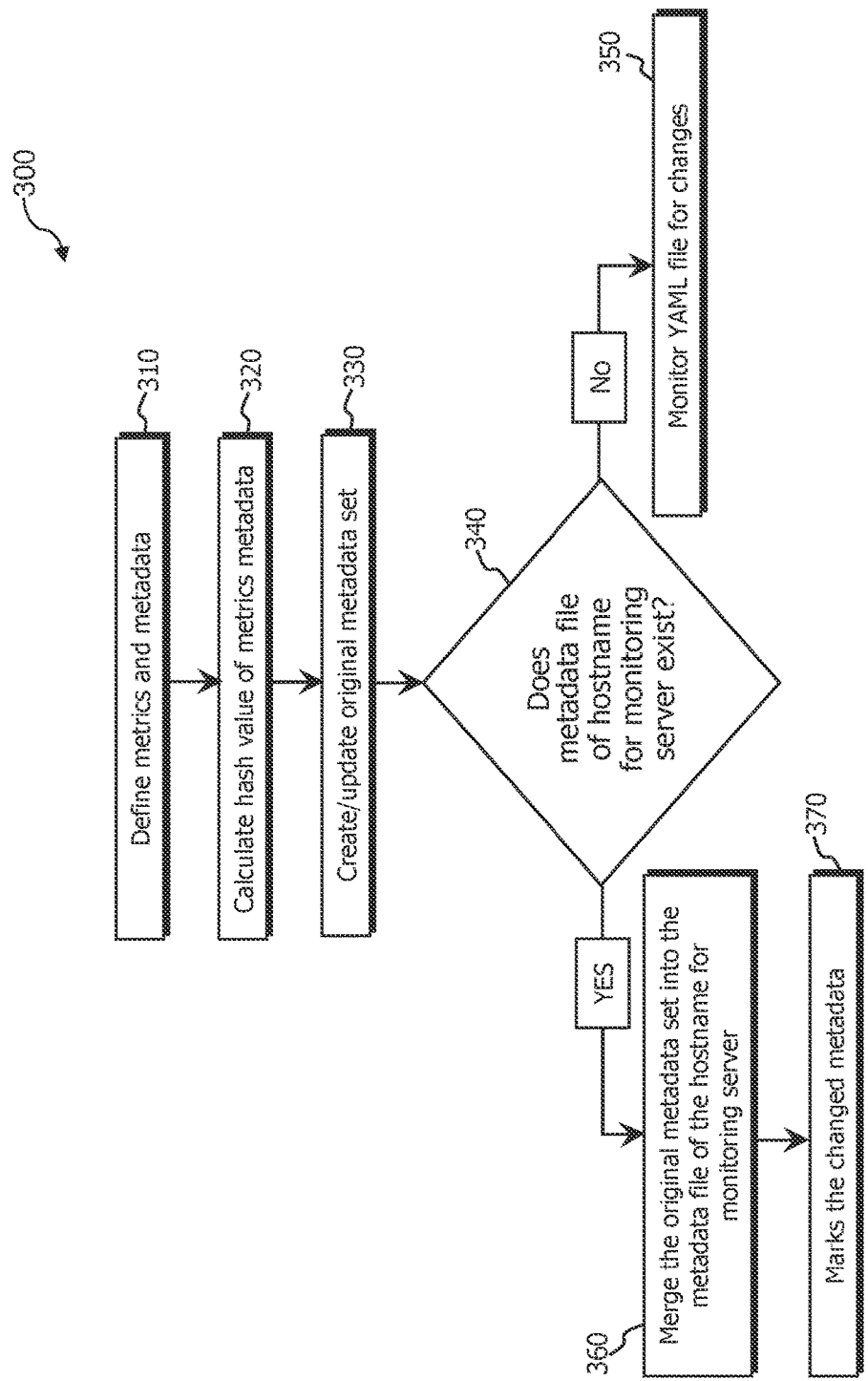
FIG. 3 illustrates a flowchart depicting a process for metadata generation, in accordance with an embodiment of the invention.

Referring now to FIG. 3, a metadata generation process 300 performed by one or more of agents 230a-n with assistance from metadata module 160 is depicted, according to an exemplary embodiment. At step 310 of process 300, one or more of agents 230*a-n* defines the metrics and the applicable metadata within the YAML file associated with the metrics. In some embodiments, agents 230*a-n* perform this step based on one or more pull requests received from one or more of monitoring servers 220*a-n*. The format of the original metadata file is provided by metadata module 160 and may be the following:<metric name>:<metadata hash>: <unit>:<type>:<help>. The applicable agent defines the aforementioned format based on the content of the metrics; however, it should be noted that agents 230*a-n* may simultaneously assist metadata generation and/or metadata synchronization performed by metadata module 160.

At step 320 of process 300, one or more of agents 230*a-n* calculate the hash value of the metrics metadata. In some embodiments, agents 230*a-n* calculates the hash value of the metrics metadata based on the one or more parameters ascertained from the YAML file, and attaches the hash value of metadata to the metric data as a label. In some embodiments, the hash value of the metrics metadata is HASH (Unit, Type, Help 1, Help 2 . . . Help N).

At step 330 of process 300, one or more of agents 230*a-n* instructs metadata module 160 to create and/or update the original metadata set. It should be noted that the update to the metadata may account for metrics and/or metadata that has either been altered or has not yet been sent to one or more of monitoring servers 220*a-n* by agents 230*a-n*.

At step 340 of process 300, one or more of agents 230*a-n* determines if the metadata file associated with the requesting monitoring server of monitoring servers 220*a-n* exists. The format of the metadata file of the requesting monitoring server is <Metric name>:<Metadata hash>:<Status>: <Unit>:<Type>:<Help>, wherein the status is either 0 indicting that the changed metadata is has not been sent or 1 indicating that the changed metadata has been sent. In some embodiments, monitoring servers 220*a-n* include a plurality of control files configured to function as a log/history of pull requests associated with monitoring module 140.

If the metadata file associated with the requesting monitoring server does not exist, then step 350 of process 300 occurs in which one or more of agents 230*a-n* monitors the YAML file for changes to the one or more parameters or any other applicable component of the YAML file. Otherwise, if the metadata file associated with the requesting monitoring server does exist, then step 360 of process 300 occurs in which the applicable agent merges the data within the original metadata file with the metadata file of requesting monitoring server (i.e., metadata_to_<hostname of monitoring server>).

At step 370 of process 300, the applicable agent marks the changed metadata as unsent (e.g., <Metric name>:<Metadata hash>:<0>:<Unit>:<Type>:<Help). In some embodiments, agents 230*a-n* actively track changes to metadata based on the hash value. One method of doing this is by adding one or more statuses to the metadata file in which the status field receives a Boolean variable, integer, or any other applicable status indicator known to those of ordinary skill in the art. It should be noted that agents 230*a-n* do not transmit the metadata each time a pull request is received from the applicable monitoring server, rather the metadata is sent only when there is a detected change to the metadata relative to the one or more parameters and/or the hash value overall (e.g., change of the status from "0" to "1"). This selectivity in transmission reserves computing resources via the applicable agent attaching the hash value as a label to the metric data and syncing back to the applicable monitoring server. Synchronization between the applicable agent and monitoring server reduces the network traffic due to the fact that the synchronization is triggered only when there is a change/modification detected in the hash value and/or metadata.

Figure 4:
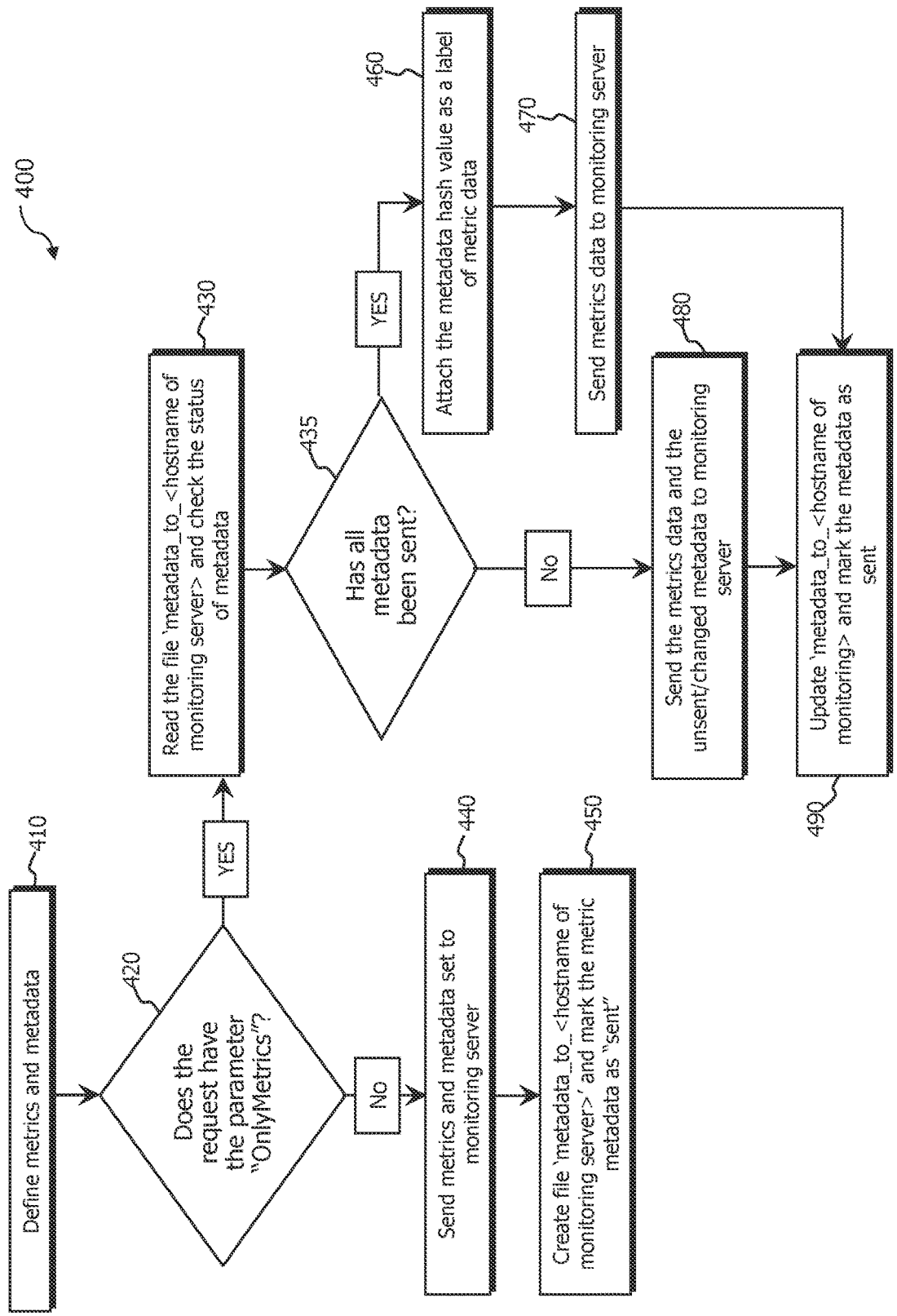
FIG. 4 illustrates a flowchart depicting a process for agent-side metadata synchronization, in accordance with an embodiment of the invention.

Referring now to FIG. 4, a metadata synchronization process 400 performed by one or more of agents 230*a-n* is depicted, according to an exemplary embodiment. At step 410 of process 400, one or more of agents 230*a-n* receives a pull request for metadata from at least one of monitoring servers 220*a-n* in which the pull request a query for a plurality of metrics derived from collected data relating to devices within environment 100. In some embodiments, the pull requests include a query for metrics based on one or more parameters which may be located within applicable definitions of the YAML file.

At step 420 of process 400, one or more of agents 230*a-n* determines whether the pull request of one or more monitoring servers 220*a-n* includes a request parameter indicating that only metrics data is being requested by monitoring servers 220*a-n*. It should be noted that request parameters may indicate that metrics data and/or metadata are being requested or if any other applicable derivative of the metrics and/or metadata are requested. For example, agents 230*a-n* determine whether the request parameter indicates a request for both metrics data and metadata based upon one or more of agents 230*a-n* confirming that the request parameter is not for metrics only. This filtration process in intended to preserve computing resources by preventing unnecessary metadata transfers specifically when only metrics are requested, and this may apply to the initial connection stage between agents 230*a-n* and monitoring servers 220*a-n*. If the request includes the "OnlyMetrics" parameters, then step 430 of process 400 occurs in which one or more of agents 230*a-n* reads the metadata file of the requesting monitoring server of monitoring servers 220*a-n* in order to check the status of the metadata. In some embodiments, the checking of the status of the metadata is based upon the applicable agent of agents 230*a-n* determining that the pull request includes the parameter indicating that only metrics are being requested. As previously mentioned, agents 230*a-n* checking for the status of metadata is interpreted based upon the ascertainable status indicator of "0" or "1" within the metadata file of the requesting monitoring server. For example, the following metadata file:<Onlymetrics>: <s8skdfiwe82309 fj>:<1>:<KB>:<data>:<The cache size of collect agent>, indicates that all metadata associated with the metadata file of the requesting monitoring server has been sent. In some embodiments, the status field of the metadata file of the requesting monitoring server is a Boolean variable (e.g., True or False) indicating whether metadata has been transmitted or not.

It should be noted that one or more of agents 230*a-n* are designed to continuously check as to whether any of the metadata associated with the requesting monitoring server has not been sent. In some embodiments, one or more of agents 230*a-n* may utilize server 120 to assist with this step in order to confirm that all applicable metadata and/or updates to the metadata have been accounted for. For example, tracking, monitoring, and confirmation of transmitted metadata may be viewed in real-time by users via one or more graphical interfaces provided on the centralized platform. Server 120 may also database 130 and/or metadata database 165 in order to perform analytics on metrics and/or metadata of the metrics, and provide said analytics to the applicable agent in order to confirm that all applicable metadata has been transmitted.

If the request includes the "OnlyMetrics" parameters, then step 440 of process 400 occurs in which all the metrics data along with the unsent and/or updated metadata is sent to the requesting monitoring server. At step 450, one or more of agents 230*a-n* finalizes the synchronization with the requesting monitoring server by creating a metadata file of the requesting monitoring server in the instance in which one has not already been created, and marks the metric metadata as sent.

Once the metadata file of the requesting monitor server has been read and the status of the metadata has been checked, step 435 of process 400 occurs in which one or more of agents 230*a-n* makes a determination as to whether all applicable metadata has been sent. If all applicable metadata has been sent, then step 460 of process 400 in which the applicable agent attaches the metadata hash value as a label of the metric data. The attachment of the metadata hash value as a label is a form of dynamic referencing that preserves computing resources by allowing synchronization back to the requesting monitoring server only when the hash value and metadata is changed; thus, reducing network traffic. Otherwise, step 480 of 400 occurs, in which the applicable agent transmits the unsent and/or updated metadata to the requesting monitoring server.

At step 470 of process 400, the applicable agent sends the metrics and/or the applicable metadata to the requesting monitoring server once the metadata hash value is labelled to the metrics data. At step 490 of process 400, the applicable agent updates the metadata file of the requesting monitoring server and marks the metadata as sent. In some embodiments, the centralized platform may also be utilized to allow users to manually check whether metrics and metadata have been successfully transmitted.

Figure 5:
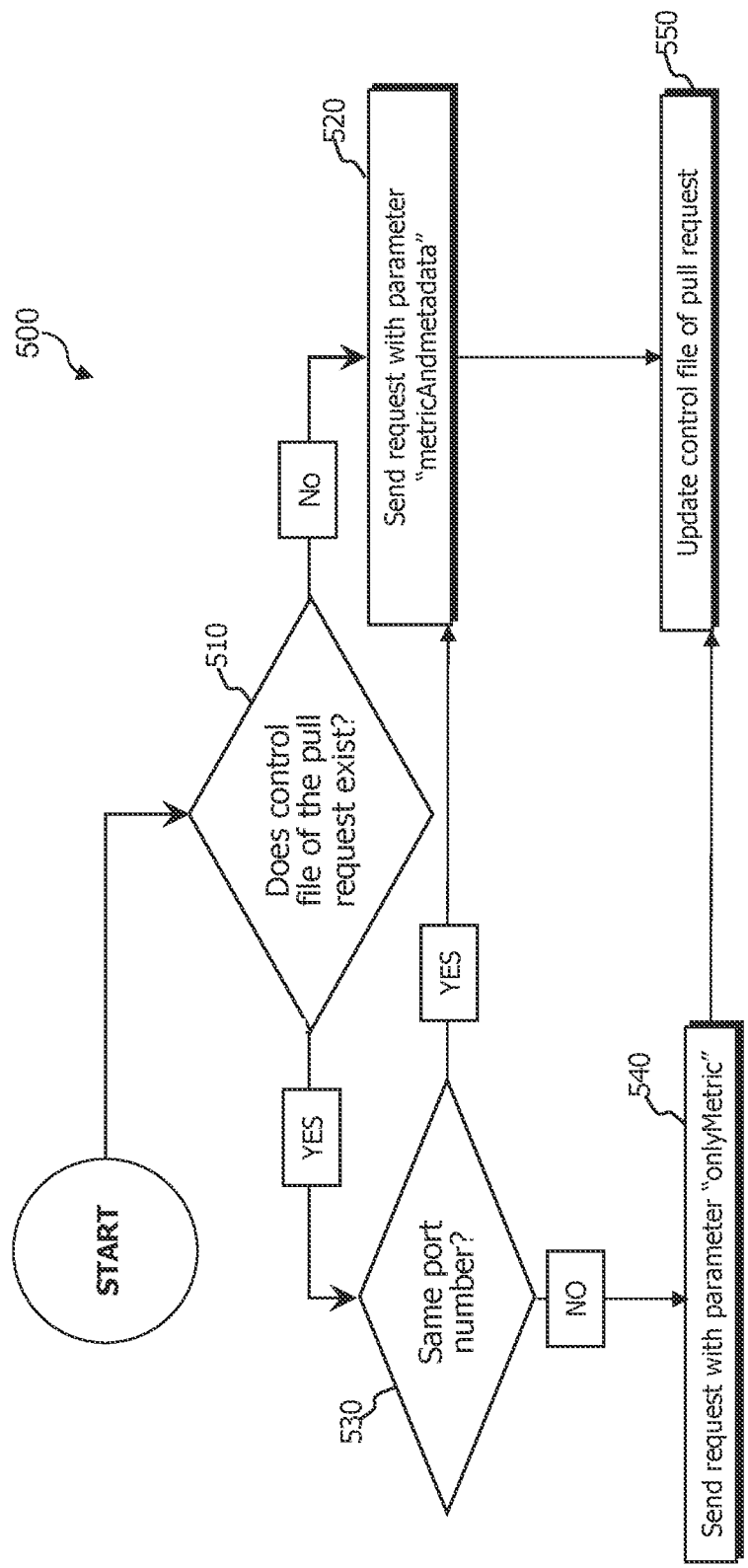
FIG. 5 illustrates a flowchart depicting a process for monitoring server-side metadata synchronization, in accordance with an embodiment of the invention.

Referring now to FIG. 5, a monitoring server-side metadata synchronization process 500 performed by one or more of monitoring servers 220*a-n* is depicted, according to an exemplary embodiment. At step 510 of process 500, the applicable monitoring server of monitoring servers 220*a-n* makes a determination as to whether a control file associated with the applicable pull request exists within the plurality of control files of monitoring module 140 stored in database 130. In some embodiments, monitoring module 140 is configured to generate a logs via pull requests that pull all changes to metrics data and metadata into a tree structure or any other applicable data structure allowing users to review and/or modify the metrics data and metadata via the centralized platform. The logs may be viewed prior to and/or after synchronization with agents 230*a-n*. Pull requests may be protocols may be synonymous with P2P protocols and augmentations thereof in which handshake messages are exchanged in order to acquire monitoring data or any other applicable data for metrics.

If it is determined that the control file of the pull request of the requesting monitoring server does not exist, then step 520 of process 500 occurs in which the requesting monitoring server sends the pull request with the parameter "MetricandMetadata" specifying that both metric data and metadata are requested. Otherwise, step 530 of process 500 occurs in which the requesting monitoring server determines whether the same applicable port number associated with the control file applies. If it is determined that the same port number applies then the requesting monitoring server sends the pull request with the parameter "MetricandMetadata"; otherwise, step 540 of process 500 occurs in which requesting monitoring server sends the pull request with the parameter "onlyMetric" specifying that only metrics data is requested.

At step 550 of process 500, the requesting monitoring server instructs monitoring module 140 to update the control file of the pull request, which is subsequently stored in database 130. It should be noted that the updating of the control file assists metadata synchronization performed by monitoring servers 220*a-n* in which monitoring servers 220*a-n* are continuously listening for metadata pull request from analysis server 210 for specific metadata sets while pushing metrics data to analysis module 150.

Figure 6:
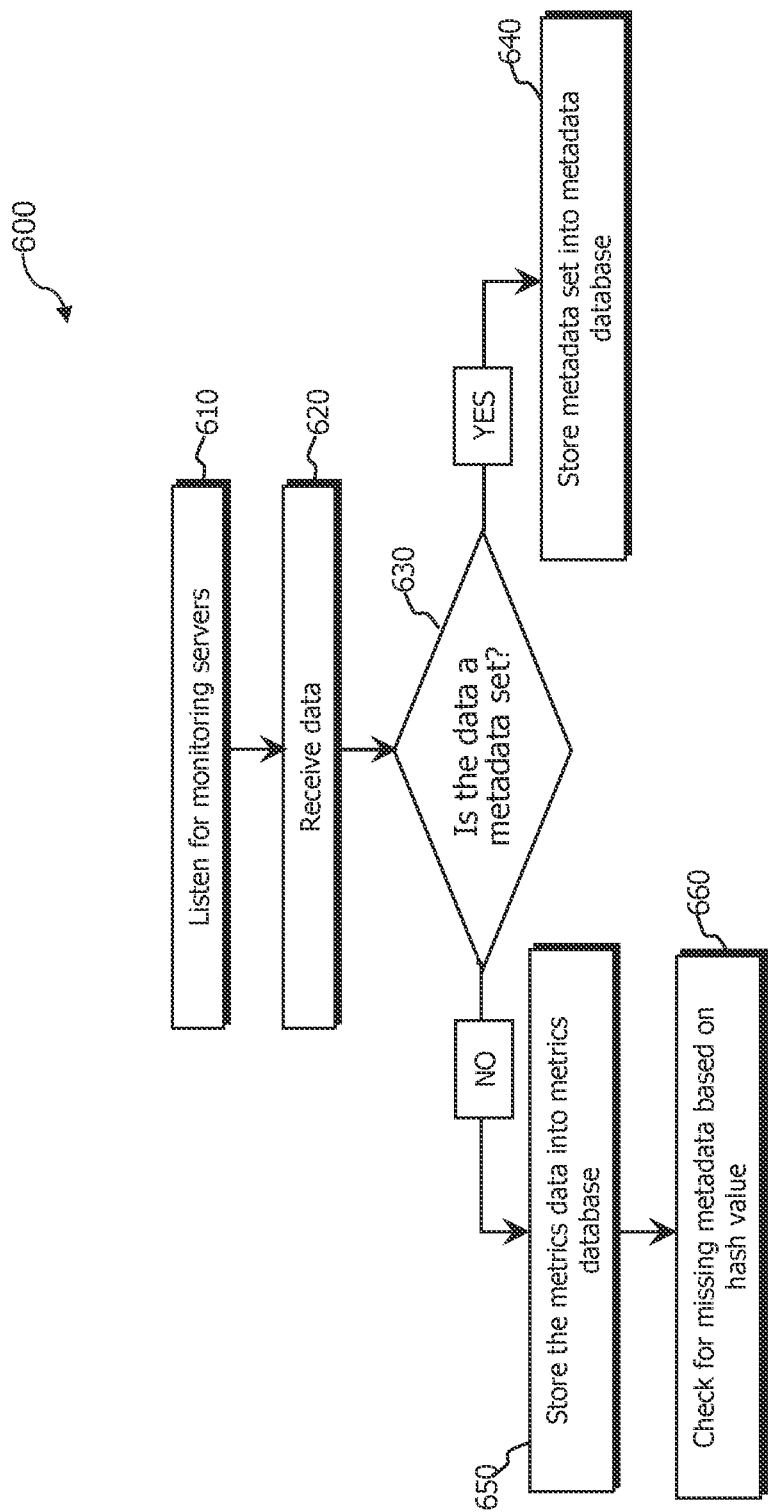
FIG. 6 illustrates a flowchart depicting a process for analysis server-side metadata synchronization and aggregation, in accordance with an embodiment of the invention.

Referring now to FIG. 6, a metadata synchronization and aggregation process 600 performed by analysis server 210 is depicted, according to an exemplary embodiment. At step 610 of process 600, analysis server 210 is continuously listening for transmissions and/or requests for transmissions from monitoring servers 220*a-n*. It should be noted that analysis module 150 is configured to instruct analysis server 210 to transmit a plurality of metadata pull requests to monitoring servers 220*a-n*; however, analysis module 150 transmits these instructions upon detecting that metadata of the metrics data and/or a subset thereof is missing. This approach avoids unnecessary metadata transfers at each level of architecture 200; thus, preserving overall computing resources by reducing traffic.

At step 620 of process 600, analysis server 210 receives data from monitoring servers 220*a-n* in which the data may include but is not limited to metrics data, applicable metadata, monitoring data, or any other applicable type of data configured to be received and processed by an analysis platform. At step 630 of process 600, analysis server 210 processes the received data in order to determine whether the received data is a metadata set. Analysis server 210 is designed to use natural language processing, natural language toolkits, clustering/grouping, or any other applicable data processing functions known to those of ordinary skill in the art in order to determine whether the received data includes a metadata set. If the received data includes one or more metadata sets then step 640 of process 600 occurs in which analysis server 210 aggregates the one or more metadata sets and stores them in metadata database 165.

Otherwise, step 650 of process 600 occurs in which analysis server 210 classifies the received data as metrics data and stores the metrics data in metrics database 155. It should be noted that the synchronization between analysis server 210 and monitoring servers 220*a-n* is performed by analysis module 150. Analysis server 210 continuously filters through metrics database 155 in order to determine if metadata of the metrics data is missing.

At step 660 of process 600, analysis server 210 checks for missing metadata associated with the metrics data based on a lack of detection of the calculated hash value in metadata database 165. If the hash value is not detected analysis module 150 instructs analysis server 210 to transmit pull requests to monitoring servers 220*a-n* for the applicable metadata sets, updating metadata database 165 accordingly as requests are fulfilled. Due to analysis server 210 being configured to not demand high requirements for real-time displaying, analysis server 210 retrieves the metrics data when the metadata hash value does not exist allowing analysis server 210 to find the corresponding metadata info of the metadata hash value by connecting to monitoring servers 220*a*.

In some embodiments, step 660 occurs iteratively until the hash value is detected by one or more of monitoring servers 220*a-n* and analysis module 150 confirms based on one or more analyses of metadata database 165 that no further modifications to metadata have occurred. Detected modifications trigger the updating of the metrics and may include, but are not limited to addition, editing, removal, etc. of the hash value or any other applicable component of the metrics and/or metrics metadata.

A primary purpose in the generation of the hash value is to not only link the metrics data with the applicable metadata via the labeling, but also to aggregate metadata and/or representations of metadata across metrics database 155, metadata database 165, and database 130 if applicable. This allows the metrics gathered across agents 230*a-n* to not be bound by any restrictions imposed by the respective software versions running on agents 230*a-n* (e.g., software/hardware specific metric versions).

Figure 7:
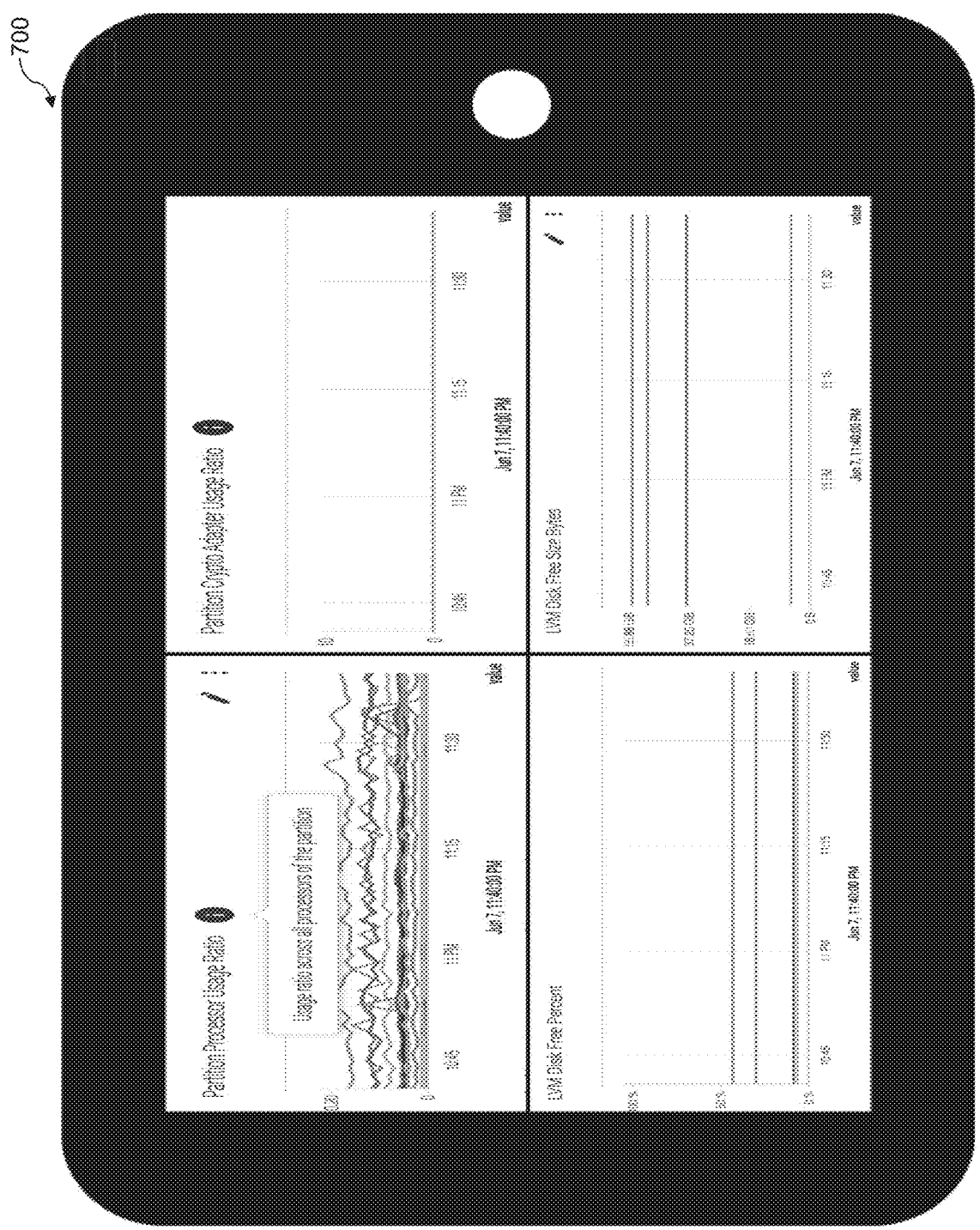
FIG. 7 illustrates an exemplary self-adapting metrics diagram depicted on a user interface, in accordance with an embodiment of the invention.

Referring now to FIG. 7, a self-adapting metrics diagram 700 is depicted, according to an exemplary embodiment. In some embodiments, diagram 700 is generated by server 120 based on the plurality of metrics provided via the one or more analyses performed by analysis module 150 on the metrics data and applicable metadata. It should be noted that diagram 700 may include analytics of the metrics, charts/graphs, or any applicable visualizations of the metrics in addition to issues and/or solutions for troubleshooting rooted in the metrics. Diagram 700 is configured to be presented to users via the centralized platform, and further designed to support dynamic modification of metric metadata by users based on functionality provided by agents 230*a-n*. In some embodiments, server 120 generates diagram 700 by loading the metric data from monitoring module 140 and/or analysis module 150 and retrieving the metadata of the metric data from metadata database 165 based on hash value. Server 120 is designed to convert the metric data and pass the metric data to a user interface module associated with server 120 and/or analysis module 140 in order to be presented to user via the centralized platform. In some embodiments, diagram 700 is included within one or more dashboards presented on the centralized platform allowing the metrics, analyses based on the metrics, and applicable alarms, notifications, reports, etc. to be simultaneously viewed and modified if applicable. It should be noted that one of the primary purposes of self-adapting metrics diagram 700 is for it to not require user intervention because the metrics are adapted with the proper metadata info (e.g., unit, type, and help). This feature saves developer and service people's effort on panel/dashboard development and maintenance. In some embodiments, self-adapting metrics diagram 700 includes reclaimable and unreclaimable memory allocation for devices/systems, help info, logical volume manager disk management, and any other applicable metrics known to those of ordinary skill in the art.

Figure 8:
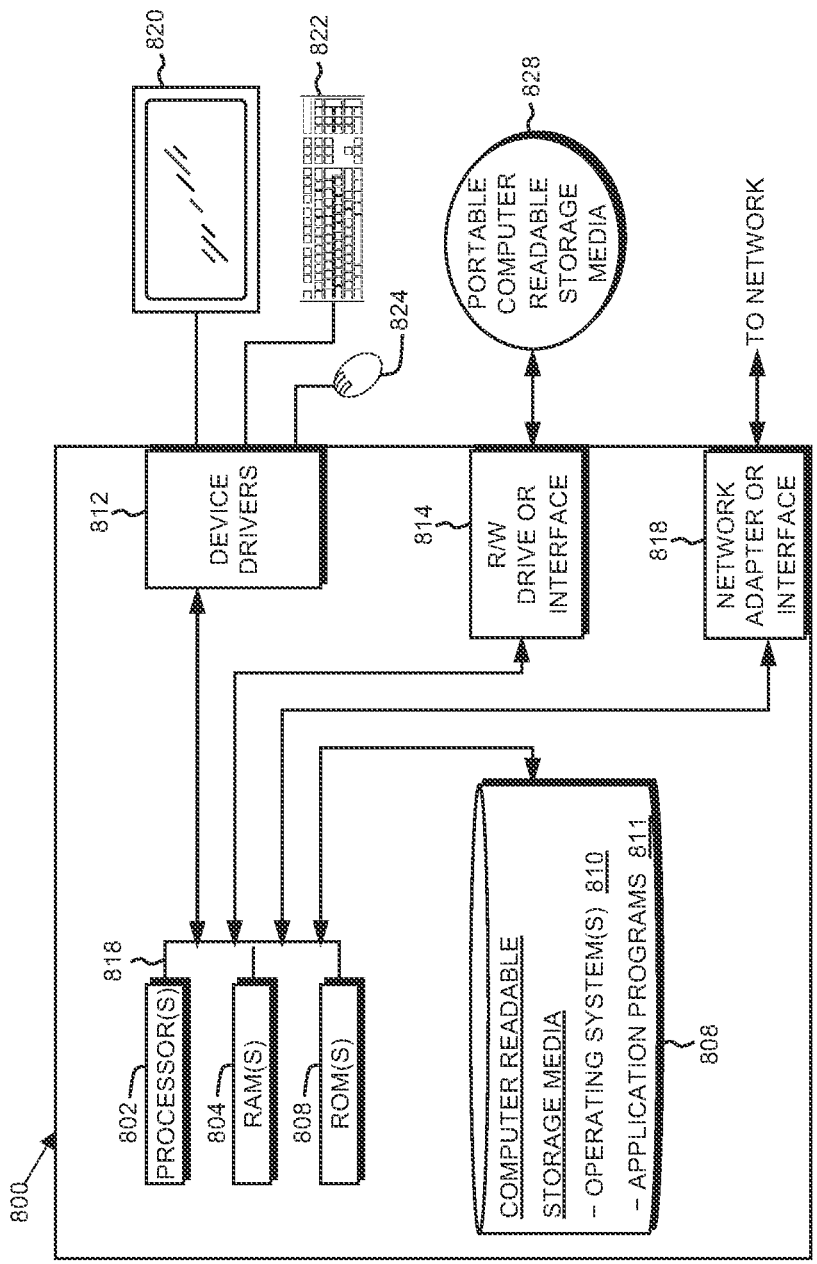
FIG. 8 depicts a block diagram illustrating components of the software application of FIG. 1, in accordance with an embodiment of the invention.

FIG. 8 is a block diagram of components 800 of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 802, 804 is representative of any electronic device capable of executing machine-readable program instructions. Data processing system 802, 804 may be representative of a smart phone, a computer system, PDA, or other electronic devices. Examples of computing systems, environments, and/or configurations that may be represented by data processing system 802, 804 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The one or more servers may include respective sets of components illustrated in FIG. 8. Each of the sets of components include one or more processors 802, one or more computer-readable RAMs 808 and one or more computer-readable ROMs 810 on one or more buses 802, and one or more operating systems 814 and one or more computer-readable tangible storage devices 816. The one or more operating systems 814 may be stored on one or more computer-readable tangible storage devices 816 for execution by one or more processors 802 via one or more RAMs 808 (which typically include cache memory). In the embodiment illustrated in FIG. 8, each of the computer-readable tangible storage devices 816 is a magnetic disk storage device of an internal hard drive. Alternatively, each of the computer-readable tangible storage devices 816 is a semiconductor storage device such as ROM 810, EPROM, flash memory or any other computer-readable tangible storage device that can store a computer program and digital information.

Each set of components 800 also includes a R/W drive or interface 814 to read from and write to one or more portable computer-readable tangible storage devices 808 such as a CD-ROM, DVD, memory stick, magnetic tape, magnetic disk, optical disk or semiconductor storage device. A software program can be stored on one or more of the respective portable computer-readable tangible storage devices 808, read via the respective RAY drive or interface 818 and loaded into the respective hard drive.

Each set of components 800 may also include network adapters (or switch port cards) or interfaces 816 such as a TCP/IP adapter cards, wireless wi-fi interface cards, or 3G or 4G wireless interface cards or other wired or wireless communication links. Applicable software can be downloaded from an external computer (e.g., server) via a network (for example, the Internet, a local area network or other, wide area network) and respective network adapters or interfaces 816. From the network adapters (or switch port adaptors) or interfaces 816, the centralized platform is loaded into the respective hard drive 808. The network may comprise copper wires, optical fibers, wireless transmission, routers, firewalls, switches, gateway computers and/or edge servers.

Each of components 800 can include a computer display monitor 820, a keyboard 822, and a computer mouse 824. Components 800 can also include touch screens, virtual keyboards, touch pads, pointing devices, and other human interface devices. Each of the sets of components 800 also includes device processors 802 to interface to computer display monitor 820, keyboard 822 and computer mouse 824. The device drivers 812, R/W drive or interface 818 and network adapter or interface 818 comprise hardware and software (stored in storage device 804 and/or ROM 806).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
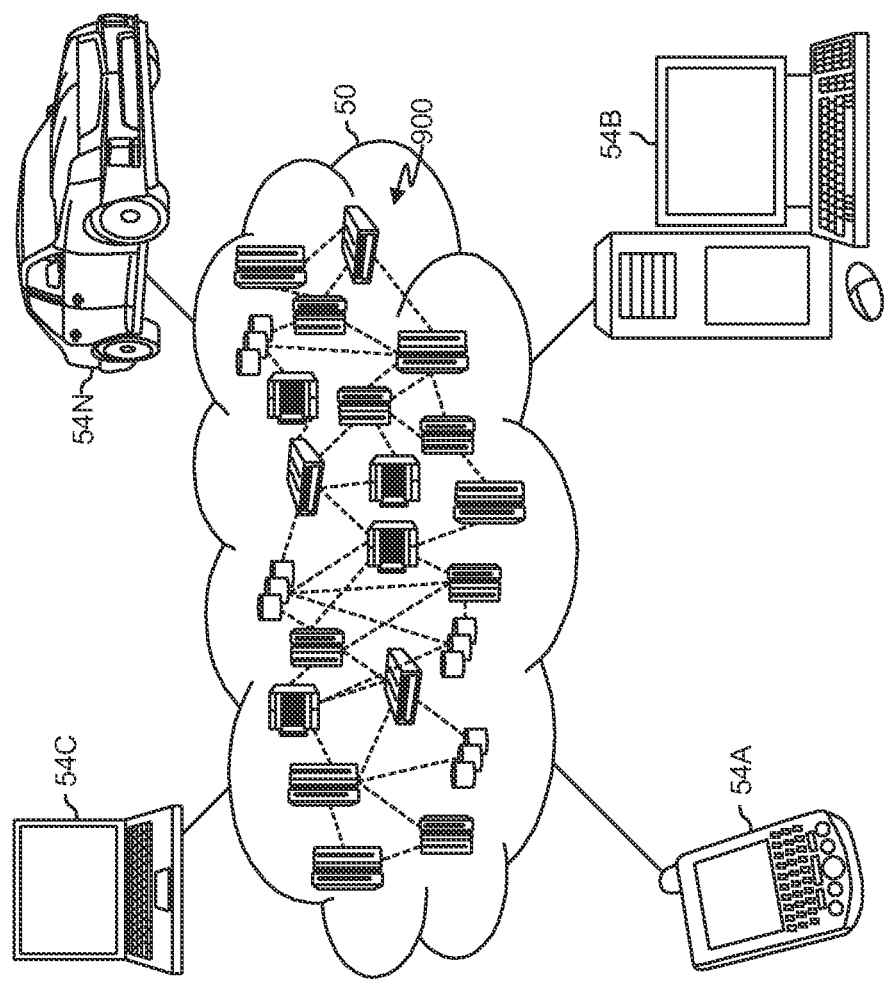
FIG. 9 depicts a cloud-computing environment, in accordance with an embodiment of the present invention.

Referring now to FIG. 9, illustrative cloud computing environment 900 is depicted. As shown, cloud computing environment 900 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 54A-N shown in FIG. 7 are intended to be illustrative only and that computing nodes 50 and cloud computing environment 900 can communicate with any type of computerized device over any type of network and/or network addressable connection (e.g., using a web browser).

Figure 10:
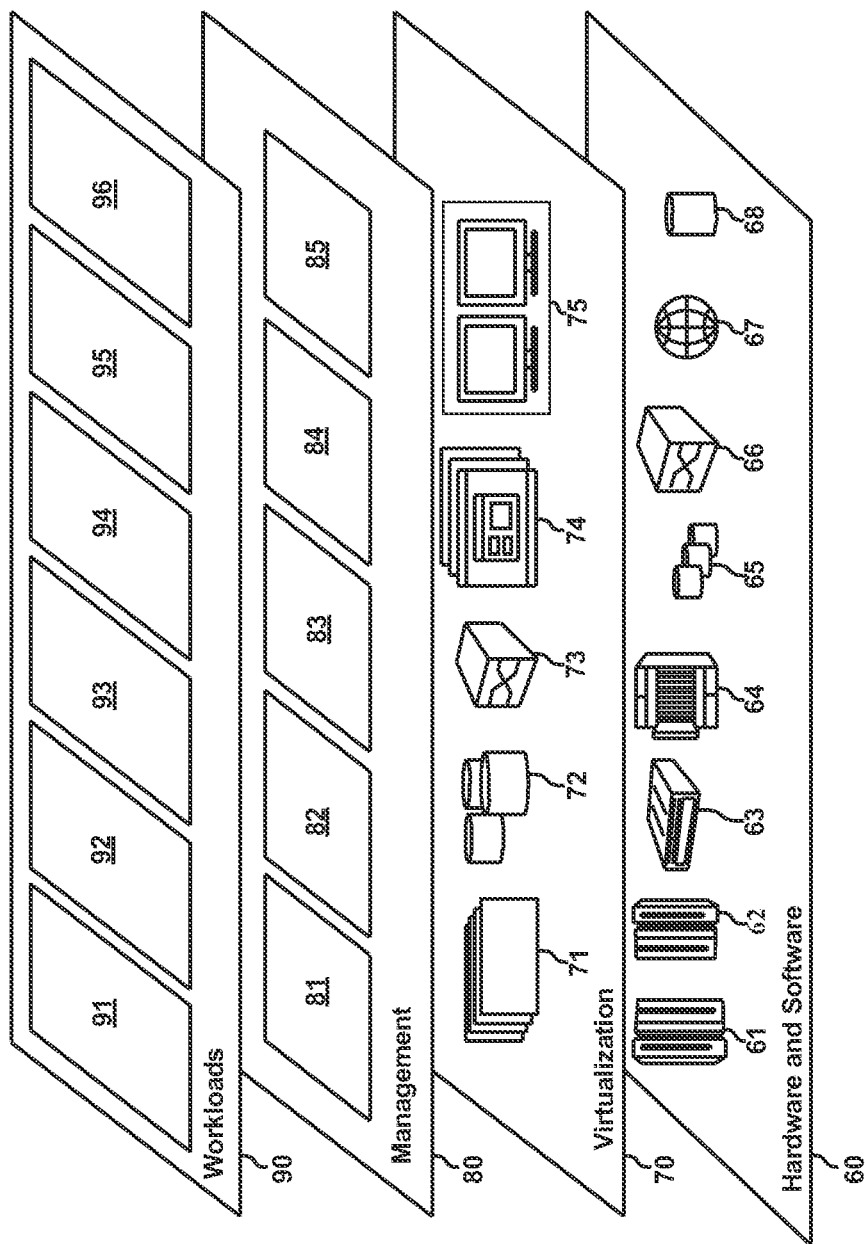
FIG. 10 depicts abstraction model layers, in accordance with an embodiment of the present invention.

Referring now to FIG. 10 a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 66 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method of monitoring metadata, the method comprising:
   receiving, by a computing device, a plurality of metrics;
   identifying, by the computing device, a plurality of metadata associated with the plurality of metrics;
   calculating, by the computing device, a hash value of the plurality of metadata based on the plurality of metrics;
   detecting, by the computing device, at least one modification to the plurality of metadata based on the hash value;
   wherein the detecting comprises aggregating and synchronizing the plurality of metadata based on the at least one modification; and
   updating, by the computing device, the plurality of metrics based on the at least one modification to the plurality of metadata by labeling the hash value to the plurality of metrics and dynamically referencing by synchronizing back to a requesting monitoring module associated with the plurality of metrics based on the at least one modification to the plurality of metadata;
   wherein updating comprises removing one or more inconsistencies of a data type from the plurality of metrics imposed by one or more agents running distinct software versions.

2. The computer-implemented method of claim 1, further comprising:
   generating, by the computing device, a self-adapting metrics diagram including the updated plurality of metrics; and
   displaying, by the computing device, the self-adapting metrics diagram on a graphical interface.

3. The computer-implemented method of claim 2, wherein generating the self-adapting metrics diagram comprises:
   loading, by the computing device, the plurality of metrics;
   requesting, by the computing device, the plurality of metadata based on the hash value;
   identifying, by the computing device, a data type and a data unit associated with the plurality of metadata; and
   converting, by the computing device, the plurality of metrics based on the data type and data unit.

4. The computer-implemented method of claim 1, wherein detecting at least one modification to the plurality of metadata comprises:
   utilizing, via the computing device, the hash value to determine at least a subset of the plurality of metadata is missing;
   transmitting, via the computing device, a pull request for the subset based on the determination.

5. The computer-implemented method of claim 1, wherein calculating the hash value comprises:

assigning, by the computing device, a status to a metadata file associated with a requesting monitoring server;
wherein the hash value is a label to the plurality of metrics and links the plurality of metrics to the plurality of metadata.

6. The computer-implemented method of claim 5, wherein updating the plurality of metrics comprises:
updating, by the computing device, the status based on the at least one modification indicating the plurality of metadata has been transmitted.

7. The computer-implemented method of claim 1, wherein identifying the plurality of metadata comprises:
extracting, by the computing device, a plurality of parameters from a YAML file associated with the plurality of metrics;
generating, by the computing device, a control file including a history of pull requests associated with the plurality of metrics and the plurality of metadata; and
transmitting, by the computing device, a pull request including at least one parameter of the plurality of parameters based on the control file.

8. A computer program product using a computing device for synchronizing metadata, comprising:
one or more non-transitory computer-readable storage media and program instructions stored on the one or more non-transitory computer-readable storage media, the program instructions, when executed by the computing device, cause the computing device to perform a method comprising:
receiving, by a computing device, a plurality of metrics;
identifying, by the computing device, a plurality of metadata associated with the plurality of metrics;
calculating, by the computing device, a hash value of the metadata based on the plurality of metrics;
labeling, by the computing device, the hash value to the plurality of metrics and dynamically referencing a detected change to the hash value by synchronizing back to a requesting monitoring module associated with the plurality of metrics; and
in response to the detected change to the hash value, synchronizing, by the computing device, a plurality of servers by retrieving the plurality of metadata;
wherein the dynamic referencing comprises removing one or more inconsistencies of a data type from the plurality of metrics imposed by one or more agents running distinct software versions.

9. The computer program product of claim 8, comprising instructions to further cause the computing device to perform a method comprising:
aggregating, by the computing device, the plurality of metadata into a plurality of databases associated with the plurality of servers, wherein the hash value links the plurality of metadata with the plurality of metrics.

10. The computer program product of claim 8, wherein identifying the plurality of metadata further comprises instructions to further cause the computing device to perform:
extracting, by the computing device, a plurality of parameters from a YAML file associated with the plurality of metrics;
generating, by the computing device, a control file including a history of pull requests associated with the plurality of metrics and the plurality of metadata; and
transmitting, by the computing device, a pull request including at least one parameter of the plurality of parameters based on the control file.

11. The computer program product of claim 8, wherein calculating the hash value of the metadata further comprises instructions to further cause the computing device to perform:
assigning, by the computing device, a status to a metadata file associated with a requesting monitoring server;
wherein the hash value links the plurality of metrics to the plurality of metadata.

12. The computer program product of claim 11, wherein labeling the hash value to the plurality of metrics further comprises instructions to further cause the computing device to perform:
updating, by the computing device, the plurality of metrics based on detection of at least one modification to the plurality of metadata based on the hash value;
wherein updating the plurality of metrics includes updating the status based on the at least one modification indicating the plurality of metadata has been transmitted.

13. A computer system for monitoring metadata, the computer system comprising:
one or more processors, one or more computer-readable memories, and program instructions stored on at least one of the one or more computer-readable memories for execution by at least one of the one or more processors to cause the computer system to:
program instructions to receive a plurality of metrics;
program instructions to identify a plurality of metadata associated with the plurality of metrics;
program instructions to calculate a hash value of the plurality of metadata based on the plurality of metrics;
program instructions to detect at least one modification to the plurality of metadata based on the hash value;
wherein the program instructions to detect comprise program instruction to aggregate and synchronize the plurality of metadata based on the at least one modification; and
program instructions to update the plurality of metrics based on the at least one modification to the plurality of metadata by labeling the hash value to the plurality of metrics and dynamically referencing by synchronizing back to a requesting monitoring module associated with the plurality of metrics based on the at least one modification to the plurality of metadata;
wherein the program instructions to update comprise program instructions to remove one or more inconsistencies of a data type from the plurality of metrics imposed by one or more agents running distinct software versions.

14. The computer system of claim 13, further comprising:
program instructions to generate a self-adapting diagram including the updated plurality of metrics; and
program instructions to display the self-adapting diagram on a graphical interface.

15. The computer system of claim 14, wherein the program instructions to generate the self-adapting diagram comprise:
program instructions to load the plurality of metrics;
program instructions to request the plurality of metadata based on the hash value;
program instructions to identify a data type and a data unit associated with the plurality of metadata;
program instructions to convert the plurality of metrics based on the data type and data unit.

16. The computer system of claim 13, wherein program instructions to detect at least one modification to the plurality of metadata further comprises:
program instructions to utilize the hash value to determine at least a subset of the plurality of metadata is missing;
program instructions to transmit a pull request for the subset based on the determination.

17. The computer system of claim 13, wherein program instructions to calculate the hash value comprises:
program instructions to assign a status to a metadata file associated with a requesting monitoring server;
wherein the hash value is a label to the plurality of metrics and links the plurality of metrics to the plurality of metadata.

18. The computer system of claim 17, wherein program instructions to update the plurality of metrics further comprise:
program instructions to update the status based on the at least one modification indicating the plurality of metadata has been transmitted.

19. The computer system of claim 17, wherein the status is a Boolean variable or an integer.

20. The computer system of claim 13, wherein program instructions to identify the plurality of metadata further comprises:
program instructions to extract a plurality of parameters from a YAML file associated with the plurality of metrics;
program instructions to generate a control file including a history of pull requests associated with the plurality of metrics and the plurality of metadata; and
program instructions to transmit a pull request including at least one parameter of the plurality of parameters based on the control file.

* * * * *